(12) United States Patent (10) Patent No.: US 8,109,559 B2
Nakamori et al. (45) Date of Patent: Feb. 7, 2012

(54) DOOR STRUCTURE OF VEHICLE (75) Inventors: Yoji Nakamori, Gamagori (JP); Yutaka Fujiwara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 606 days.

(21) Appl. No.: 11/885,642

(22) PCT Filed: Mar. 29, 2006

(86) PCT No.: PCT/JP2006/306529
§ 371 (c)(1),
(2), (4) Date: Oct. 15, 2007

(87) PCT Pub. No.: WO2006/114973
PCT Pub. Date: Nov. 2, 2006

(65) Prior Publication Data
US 2008/0178533 A1    Jul. 31, 2008

(30) Foreign Application Priority Data
Apr. 18, 2005 (JP) .................. 2005-119229

(51) Int. Cl.
*B60J 5/00* (2006.01)
*B60J 5/04* (2006.01)
(52) U.S. Cl. ............... 296/146.7; 296/146.2; 296/146.5; 296/146.6; 49/502
(58) Field of Classification Search ............... 296/146.7, 296/37.13, 37.8, 38, 152, 146.2, 146.5, 146.6; 224/543, 915; 49/502, 352, 349
See application file for complete search history.

(56) References Cited

U.S. PATENT DOCUMENTS

| 4,619,477 | A  |    | 10/1986 | Kneib et al. |
| 5,004,292 | A  |    | 4/1991  | Horne |
| 5,906,409 | A  |    | 5/1999  | DeRees et al. |
| 6,116,672 | A  | *  | 9/2000  | Cannon et al. ............. 296/37.13 |
| 6,139,088 | A  |    | 10/2000 | Okamoto et al. |
| 6,183,038 | B1 | *  | 2/2001  | Hansen et al. ............. 296/146.7 |

(Continued)

FOREIGN PATENT DOCUMENTS

DE    23 53 680 A1    5/1975

(Continued)

OTHER PUBLICATIONS

German Office Action issued in German Patent Application No. 11 2006 000 956.7 on Sep. 29, 2011.

*Primary Examiner* — Glenn Dayoan
*Assistant Examiner* — Sunsurraye Westbrook
(74) *Attorney, Agent, or Firm* — Birch, Stewart, Kolasch & Birch, LLP (57) ABSTRACT

A door structure of a vehicle, having an effective space within a vehicle compartment increased, is provided. The door structure has a carrier plate (4) fixed to an inner panel (3) for closing an opening portion (3a) formed in the inner panel (3); and a plurality of trim members (7, 8, 9) for covering an inside of the carrier plate (4) within a vehicle compartment, the plurality of trim members (7, 8, 9) including a belt line trim (7) disposed along a belt line in an upper end portion of the inner panel (3), a pocket trim (8) disposed in the vicinity of a lower portion of the inner panel (3), and an arm rest trim (9) disposed between the belt line trim (7) and the pocket trim (8).

14 Claims, 7 Drawing Sheets

U.S. PATENT DOCUMENTS

| | | | |
|---|---|---|---|
| 6,409,250 B1 * | 6/2002 | Schultheiss | 296/146.7 |
| 6,438,899 B1 | 8/2002 | Feder et al. | |
| 2002/0007598 A1 * | 1/2002 | Nishikawa et al. | 49/502 |
| 2002/0066232 A1 | 6/2002 | Tatsumi et al. | |
| 2003/0116993 A1 * | 6/2003 | Skarb et al. | 296/146.7 |
| 2004/0012226 A1 * | 1/2004 | Morrison et al. | 296/146.5 |
| 2004/0217623 A1 * | 11/2004 | Chernoff et al. | 296/146.6 |

FOREIGN PATENT DOCUMENTS

| | | |
|---|---|---|
| DE | 34 08 611 C1 | 9/1985 |
| DE | 196 50 531 A1 | 6/1997 |
| DE | 197 47 710 A1 | 5/1999 |
| DE | 201 14 907 U1 | 1/2003 |
| DE | 10 2004 034 073 A1 | 2/2006 |
| JP | 55-160918 | 5/1954 |
| JP | 59-110243 U | 7/1984 |
| JP | 61-68922 U | 5/1986 |
| JP | 63-149317 U | 9/1988 |
| JP | 6-87023 U | 12/1994 |
| JP | 8-104136 A | 4/1996 |
| JP | 8-282281 A | 10/1996 |
| JP | 9-156374 A | 6/1997 |
| JP | 2001-18654 A | 1/2001 |
| JP | 2001-247063 A | 9/2001 |
| JP | 2002-166726 A | 6/2002 |

* cited by examiner

DOOR STRUCTURE OF VEHICLE

BACKGROUND OF THE INVENTION

1. Field of the Invention

This invention relates to a door structure of a vehicle.

2. Description of the Related Art

Usually, a door structure of a vehicle includes a door structural body comprising a door outer panel and a door inner panel arranged on the outside of the vehicle and the inside of a vehicle compartment, respectively; a module plate (carrier plate) mounted to cover an opening portion formed in the door inner panel; and a door trim member disposed inside the vehicle compartment to cover the door inner panel and the carrier plate, as shown, for example, in FIGS. 1 and 2 of patent document 1. The module plate has, assembled thereto, a support portion for supporting a door glass to be ascendable and descendable, an elevating device for raising and lowering the door glass, door accessories, such as a speaker, arranged in the door structural body, and a harness connected to these electrical components.

Patent Document 1: Japanese Unexamined Patent Publication No. 2001-247063

SUMMARY OF THE INVENTION

Problems to be Solved by the Invention

With the above-described door structure of a vehicle, the carrier plate and the door trim member partly overlapped in the vehicle width direction to form an overlap portion, posing the problems of an increase in the weight and an incidental increase in the manufacturing cost. Further, the overlap portion caused the problem of narrowing an effective space within the vehicle compartment.

The present invention has been proposed in the light of the above-described problems. It is an object of the invention to provide a door structure of a vehicle in which an overlap portion, where a door trim and a carrier plate overlap, is minimized to achieve weight reduction and a decrease in the manufacturing cost and expand an effective space within a vehicle compartment.

Means for Solving the Problems

A door structure of a vehicle, according to a first aspect of the invention for solving the above problems, comprises a carrier plate (4) fixed to an inner panel (3) of a door for closing an opening portion (3a) formed in the inner panel (3), and a plurality of trim members (7, 8, 9) for partially covering an inside of the carrier plate (4) within a vehicle compartment, the plurality of trim members (7, 8, 9) being arranged at locations spaced from each other in a plane along the carrier plate (4).

A door structure of a vehicle, according to a second aspect of the invention for solving the above problems, is the door structure of a vehicle according to the first aspect of the invention, wherein the plurality of trim members (7, 8, 9) covers mounting portions (5, 6) for mounting of the carrier plate (4) onto the inner panel (3).

A door structure of a vehicle, according to a third aspect of the invention for solving the above problems, is the door structure of a vehicle according to the first or second aspect of the invention, wherein the plurality of trim members (7, 8, 9) extends in a longitudinal direction of a vehicle body, and is arranged at locations spaced from each other in a vertical direction.

A door structure of a vehicle, according to a fourth aspect of the invention for solving the above problems, is the door structure of a vehicle according to any one of the first to third aspects of the invention, wherein at least one of an elevating device (25) for raising and lowering a door glass, a door opening and closing operating device (2), and a door speaker (19) is assembled to the carrier plate (4).

A door structure of a vehicle, according to a fifth aspect of the invention for solving the above problems, is the door structure of a vehicle according to the fourth aspect of the invention, wherein the plurality of trim members (7, 8, 9) is arranged to cover a mounting portion for mounting of at least one of the elevating device (25), the door opening and closing operating device (2), and the door speaker (19) onto the carrier plate (4).

A door structure of a vehicle, according to a sixth aspect of the invention for solving the above problems, is the door structure of a vehicle according to any one of the first to fifth aspects of the invention, wherein the carrier plate (4) has a step portion (4a) formed at a predetermined position spaced from an outer edge thereof to be concave outwardly of the vehicle.

A door structure of a vehicle, according to a seventh aspect of the invention for solving the above problems, is the door structure of a vehicle according to any one of the first to sixth aspects of the invention, wherein the plurality of trim members (7, 8, 9) includes a belt line trim (7) disposed along a belt line in an upper end portion of the inner panel (3), a pocket trim (8) disposed in the vicinity of a lower portion of the inner panel (3), and an arm rest trim (9) disposed between the belt line trim (7) and the pocket trim (8).

A door structure of a vehicle, according to an eighth aspect of the invention for solving the above problems, is the door structure of a vehicle according to the seventh aspect of the invention, further comprising a control cable (14) for transmitting an operating force of an inside handle (12), which the door opening and closing operating device (29) has, to a latch portion, and wherein the carrier plate (4) has a first support portion (15, 16) for supporting the control cable (14), and a first through-hole (4f) through which the control cable (14) is inserted, and the belt line trim (7) covers the first support portion (15, 16) and the first through-hole (4f) from inside the vehicle compartment.

A door structure of a vehicle, according to a ninth aspect of the invention for solving the above problems, is the door structure of a vehicle according to the seventh aspect of the invention, further comprising a harness (20) extending from an elevating switch (17) of the elevating device (25), or from the door speaker (19), and wherein the carrier plate (4) has a second support portion (21, 22) for supporting the harness (20), and a second through-hole (4g) through which the harness (20) is inserted, and the arm rest trim (9) covers the second support portion (21, 22) and the second through-hole (4g) from inside the vehicle compartment.

Effects of the Invention

According to the present invention, the trim members are arranged only in the upper end portion of the inner panel, the lower portion of the inner panel, and the intermediate portion between the upper end portion and the lower portion. These trim members can be downsized compared with conventional trim members. Thus, weight reduction and manufacturing cost reduction can be achieved, and the effective space within

DESCRIPTION OF THE NUMERALS AND SYMBOLS

1 Vehicle
2 Outer panel
3 Inner panel
4 Carrier plate
4f First through-hole
4g Second through-hole
5, 6 Bolt or screw or clip (mounting portion)
7 Belt line trim
8 Pocket trim
9 Arm rest trim
10 Door structure of vehicle
11 Water-seal rubber
12 Inside handle
13 Latch portion
14 Control cable
15, 16 First support portion
17 Elevating switch
18 Door pull
19 Speaker
20 Harness
21, 22 Second support portion
23, 24 Connecting portion
25 Elevating device
26, 27 Mounting member
29 Door opening and closing operating device

DETAILED DESCRIPTION OF THE INVENTION

The best mode for putting a door structure of a vehicle according to the present invention into practice will be described concretely based on embodiments.

Embodiment 1

Figure 1:
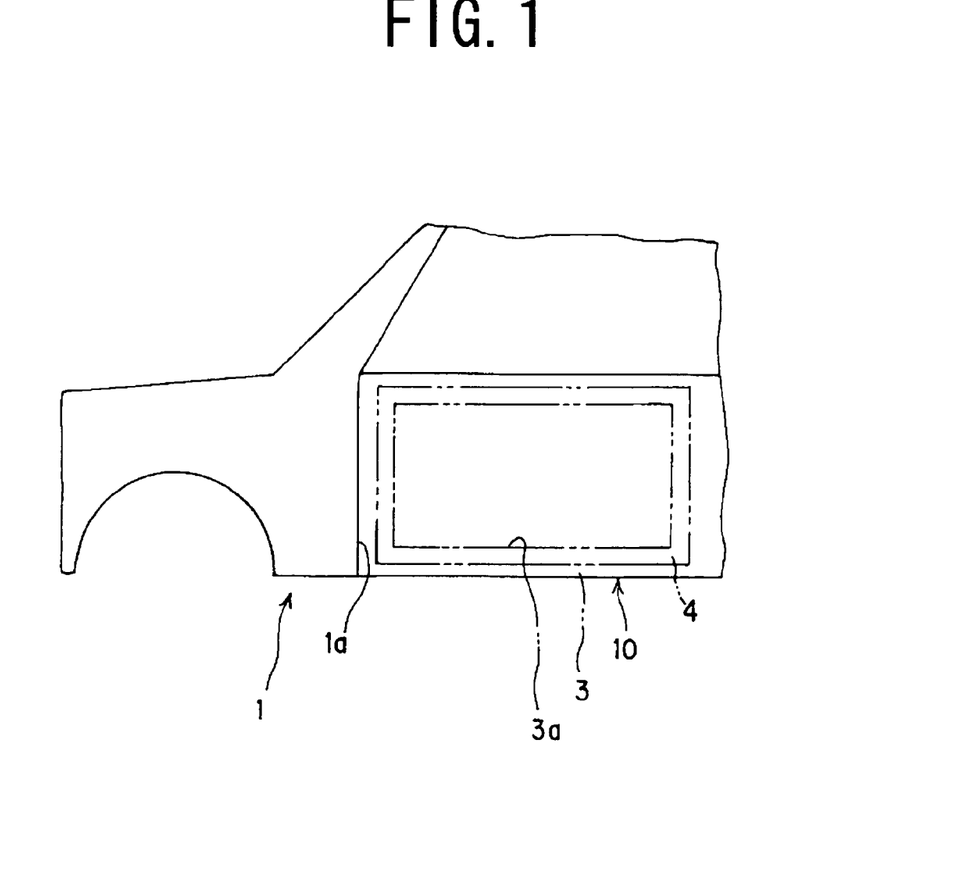
FIG. 1 is a side view of a vehicle body having a door structure of a vehicle according to a first embodiment of the present invention.
Figure 2:
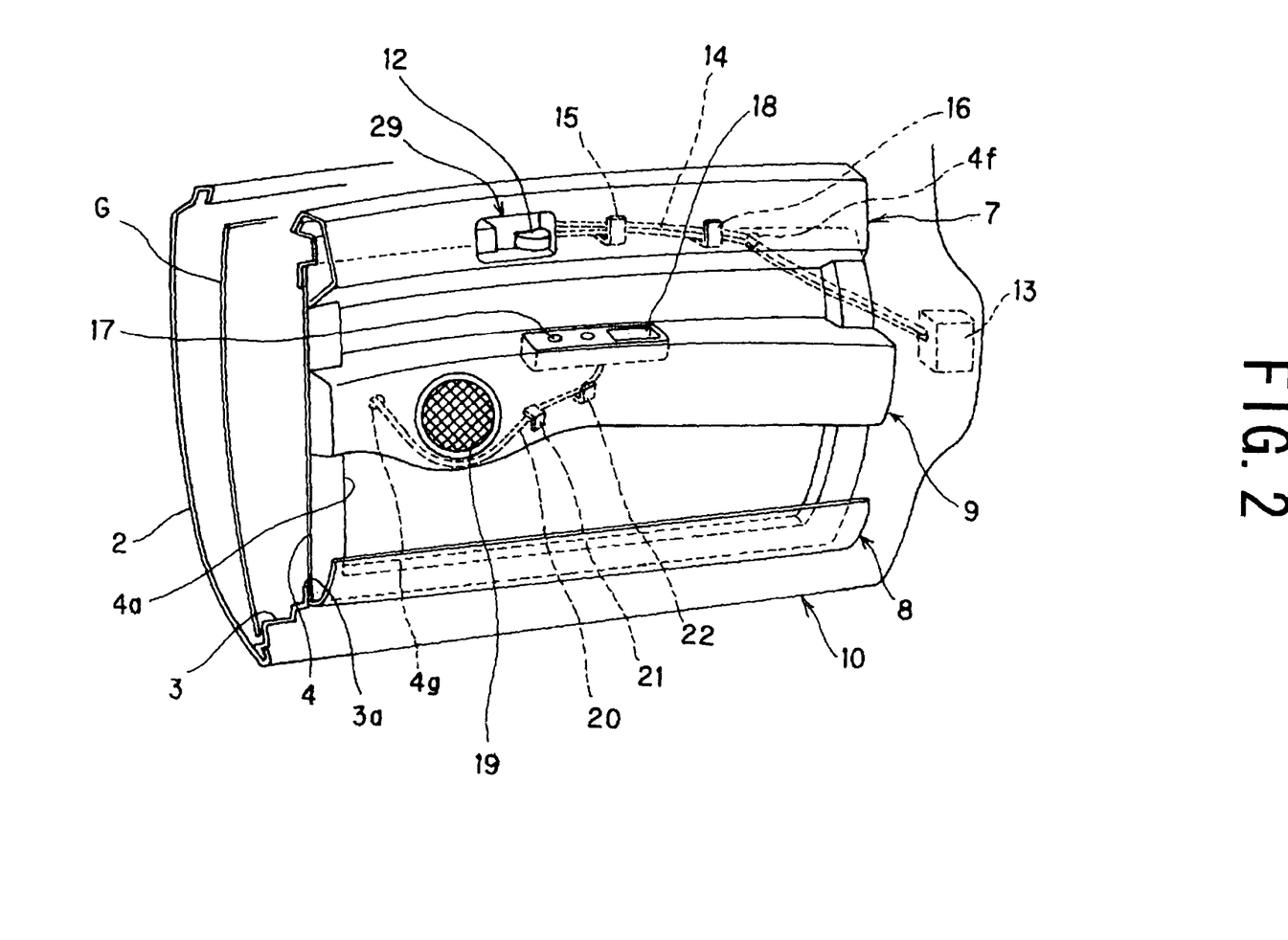
FIG. 2 is a perspective view of the door structure of a vehicle according to the first embodiment of the present invention.
Figure 3:
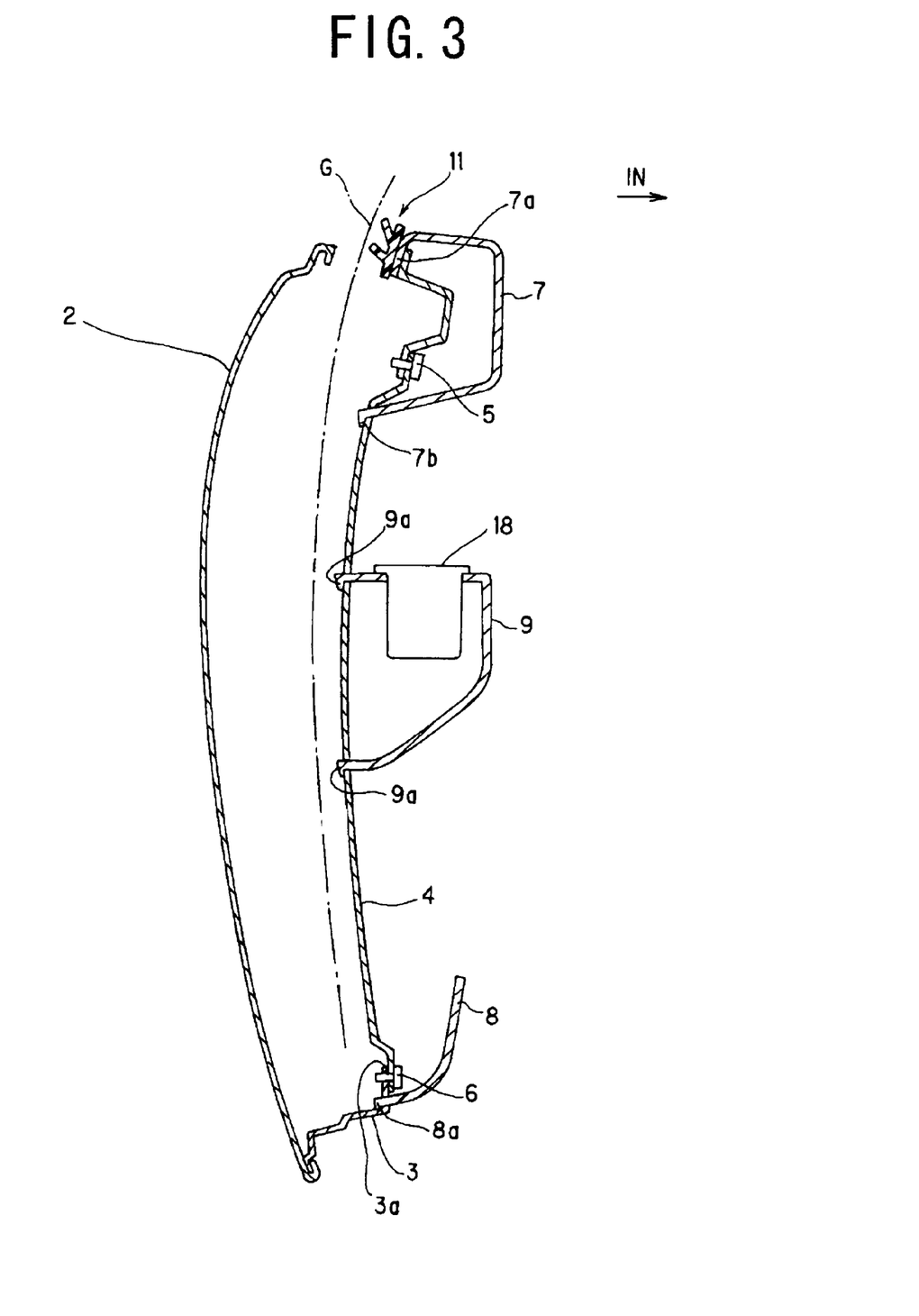
FIG. 3 is a sectional view of the door structure of a vehicle according to the first embodiment of the present invention.
Figure 4:
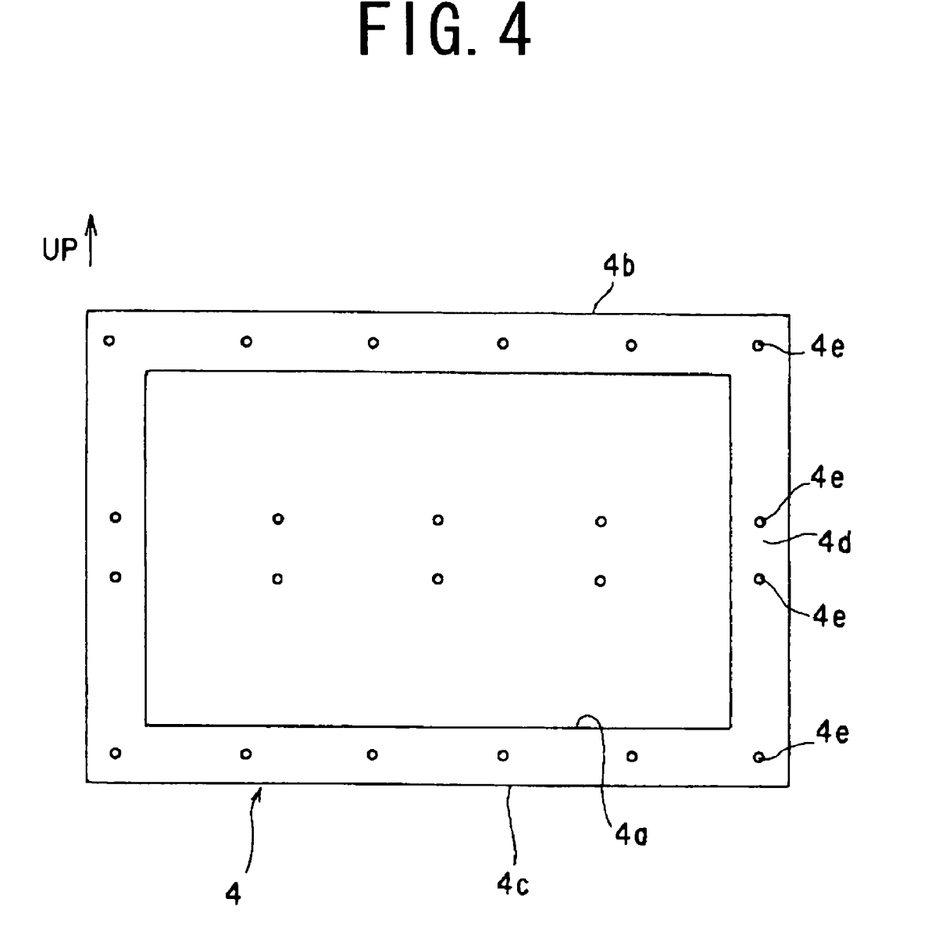
FIG. 4 is a side view of a carrier plate which the door structure of a vehicle according to the first embodiment of the present invention possesses.
Figure 5:
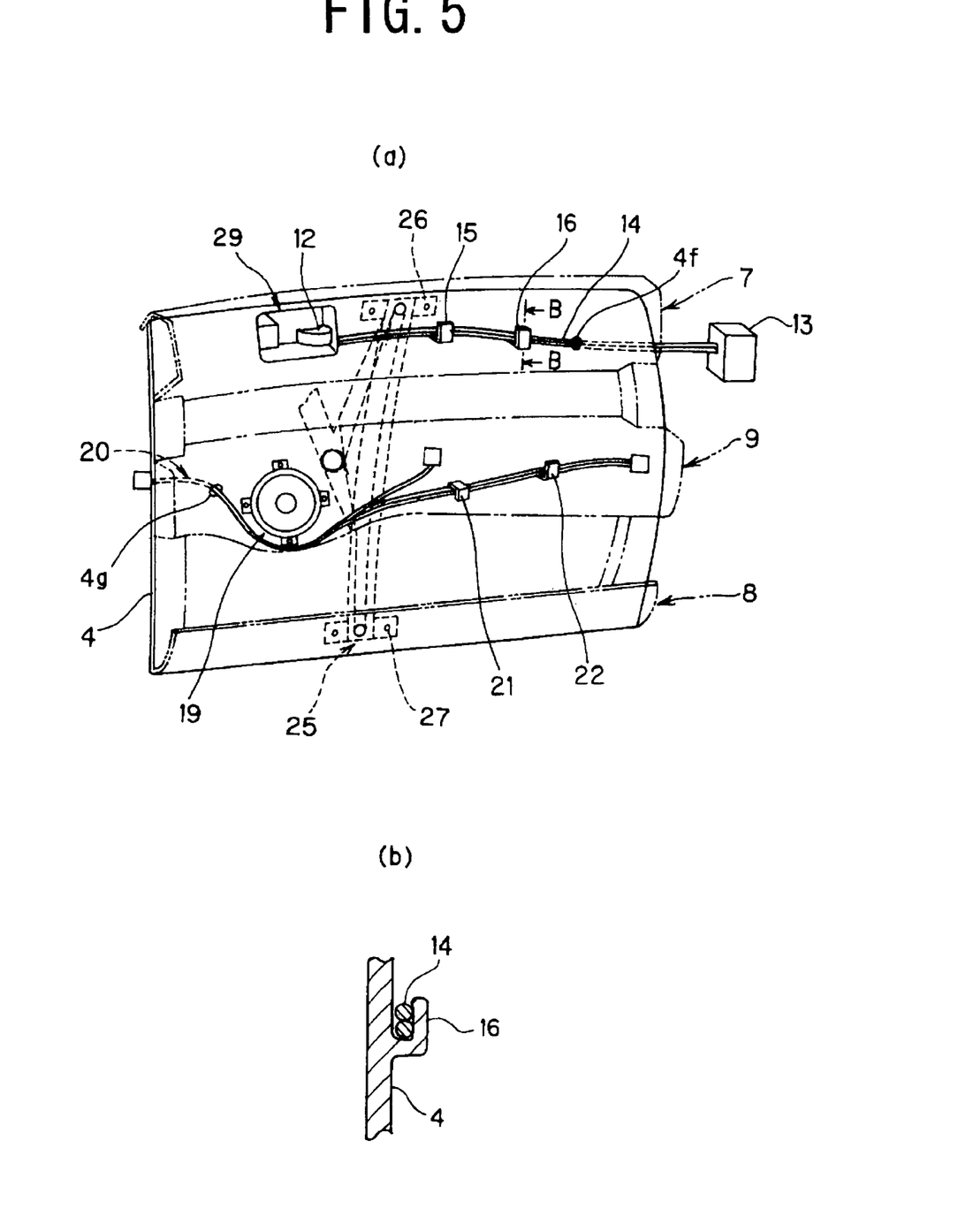
FIGS. 5(a) and 5(b) are explanation drawings of mounting of electrical components onto the carrier plate which the door structure of a vehicle according to the first embodiment of the present invention possesses.

FIG. 1 is a side view of a vehicle body having a door structure of a vehicle according to a first embodiment of the present invention. FIG. 2 is a perspective view of the door structure of the vehicle according to the first embodiment of the present invention. FIG. 3 is a sectional view of the door structure of the vehicle according to the first embodiment of the present invention. In FIG. 3, an arrowed line IN shows the interior of a vehicle compartment. FIG. 4 is a side view of a carrier plate which the door structure of the vehicle according to the first embodiment of the present invention possesses. An arrowed line UP in FIG. 4 shows an upper part of the vehicle. FIGS. 5(a) and 5(b) are explanation drawings of mounting of electrical components onto the carrier plate which the door structure of the vehicle according to the first embodiment of the present invention possesses. FIG. 5(a) shows, in perspective, the electrical components mounted onto the carrier plate, and FIG. 5(b) shows a section viewed along line B-B in FIG. 5(a).

A door structure 10 of a vehicle according to the first embodiment of the present invention is mounted on a door opening portion 1a of a vehicle 1, as shown in FIG. 1. The door structure 10 of the vehicle has an outer panel 2 disposed on the outside of the vehicle and comprising a steel plate, and an inner panel 3 disposed in the interior of a vehicle compartment and comprising a steel plate, as shown in FIGS. 2 and 3. A carrier plate 4 formed from resin is disposed to close an opening portion 3a formed in the inner panel 3, and the carrier plate 4 is fixed to the inner panel 3 by bolts or screws 5, 6 (mounting portion). Concretely, a near-upper end portion of the carrier plate 4 is fixed to the inner panel 3 by bolts or screws or clips 5, while a near-lower portion of the carrier plate 4 is fixed to the inner panel 3 by bolts or screws or clips 6. The inside of the carrier plate 4 within the vehicle compartment may be subjected to flocking or the like for better appearance.

The carrier plate 4 has a step portion 4a formed at a predetermined position spaced from the edge thereof, the step portion 4a being concave outwardly of the vehicle, as shown in FIGS. 2 to 5(a), 5(b). A plurality of holes 4e is formed at predetermined intervals in the vicinity of an upper end portion 4b of the carrier plate 4, in the vicinity of a lower portion 4c of the carrier plate 4, and a middle portion 4d located between the upper end portion 4b and the lower portion 4c. In the carrier plate 4, there are also formed a support portion for supporting a harness for electrical components to be described later, and through-holes through which the harness, etc. are passed.

On the inside of the inner panel 3 and the carrier plate 4 within the vehicle compartment, a plurality of trim members partially covering them are arranged in vertically spaced relationship in a plane along the carrier plate 4. That is, on the inside of the inner panel 3 and the carrier plate 4 within the vehicle compartment, a belt line trim 7 formed from resin is mounted on a belt line in the vicinity of the upper end portion of the carrier plate 4, a pocket trim 8 formed from resin is mounted in the vicinity of the lower portion of the carrier plate 4, and an arm rest trim 9 formed from resin is mounted in the vicinity of the middle portion between the site near the upper end portion and the site near the lower portion. The trim members 7, 8 and 9 are formed to extend in the longitudinal direction of the vehicle body. Clips 7b, 8a and 9a formed in the trim members 7, 8 and 9 are inserted into the holes 4e of the carrier plate 4 and fixed there. The trim members 7, 8 and 8 are fixed to the carrier plate 4 by the clips 7b, 8a and 9a. However, this is not limitative, and they may be fixed by bolts or screws.

A water-seal rubber 11 is mounted on a side of a folded-back portion 7a facing the outer panel 2, the folded-back portion 7a being formed by folding back an upper portion of the belt line trim 7. The water-seal rubber 11 suppresses the entry of water into a region surrounded by the carrier plate 4 and a glass window G, which is disposed between the outer panel 2 and the inner panel 3, after the water flows via the glass window G.

A door opening and closing operating device 29 is located on the belt line and mounted on the side of the inner panel 3 or the carrier plate 4 within the vehicle compartment. A control cable 14, which transmits to a latch portion 13 the operating force of an inside handle 12 possessed by the door opening and closing operating device 29, is attached to the inside handle 12. As shown in FIGS. 5(a) and 5(b), the control cable 14 is supported by a first support portion 15, 16 formed in the carrier plate 4, and has one end led to the exterior side of the carrier plate 4 after being passed through a first through-hole 4f formed in the carrier plate 4.

The upper end of the pocket trim 8 is open to allow small articles and beverage containers to be accommodated in a region surrounded by the pocket trim 8 and the carrier plate 4.

An elevating switch 17 for operating the window glass G to ascend and descend, and a door pull 18 for opening the door are mounted on the arm rest trim 9. Inside the arm rest trim 9, a speaker (door speaker) 19 is mounted. Within the arm rest trim 9, a harness 20, etc. for electrical components, such as the elevating switch 17 and the speaker 19, are disposed. As shown in FIG. 5(a), the harness 20 is supported by a second support portion 21, 22 formed in the carrier plate 14, and has one end led to the exterior side of the carrier plate 4 after being passed through a second through-hole 4g formed in the carrier plate 4.

On the exterior side of the carrier plate 4, an elevating device 25 for raising and lowering the window glass (door glass) G is mounted on the carrier plate 4 by mounting members 26, 27, as shown in FIG. 5(a). The mounting member 26 is disposed on the belt line, while the mounting member 27 is disposed in the vicinity of the lower portion of the carrier plate 4.

Accordingly, the upper end portion of the door structure 10 of the vehicle, the bolts or screws or clips 5 mounted in the vicinity of the upper end portion of the inner panel 3, the upper end portion of the carrier plate 4, the control cable 14 of the inside handle 12 mounted on the belt line trim 7, the first support portion 15, 16 formed in the carrier plate 4 for supporting the control cable 14, the first through-hole 4f formed in the carrier plate 4 for insertion of the control cable 14, and the mounting member 26 disposed on the belt line are covered with and concealed by the belt line trim 7. The lower end portion of the door structure 10 of the vehicle, the bolts or screws or clips 6 mounted in the vicinity of the lower portion of the inner panel 3, the lower end portion of the carrier plate 4, and the mounting member 27 disposed in the lower portion of the carrier plate 4 are covered with and concealed by the pocket trim 8. The harness 20 for the speaker 19 or the elevating switch 17, the second support portion 21, 22 formed in the carrier plate 4 for supporting the harness 20, and the second through-hole 4g formed in the carrier plate 4 for insertion of the harness 20 are covered with and concealed by the arm rest trim 9. As a result, the bolts or screws or clips 5, 6, the upper and lower end portions of the carrier plate 4, the harness for the electrical components, the support portions 15, 16, 21, 22 formed in the carrier plate 4, the through-holes 4f, 4g formed in the carrier plate 4, and the mounting portions for the mounting members 26, 27 are invisible from inside the vehicle compartment. Thus, the appearance of the door structure 10 of the vehicle can be prevented from deteriorating.

According to the door structure 10 of the vehicle concerned with the first embodiment of the present invention, therefore, there are the trim members including the belt line trim 7, the pocket trim 8, and the arm rest trim 9 which are arranged at spaced apart locations. Since these trim members are smaller in size than conventional trim members, weight reduction and manufacturing cost reduction can be achieved, and the effective space within the vehicle compartment can be increased. Furthermore, their mounting on the inner panel 3 is facilitated, increasing the operating efficiency.

Moreover, the trim members 7, 8, 9 can be disposed only in a minimum required range in consideration of usage and appearance, and the trim members 7, 8, 9 can be further downsized in comparison with the conventional trim members. Thus, weight reduction and manufacturing cost reduction can be achieved more reliably. Besides, their mounting on the inner panel 3 becomes easier, increasing the operating efficiency further.

In addition, the appearance can be improved, and the carrier plate 4 can be effectively used as a decorative surface.

Figure 6:
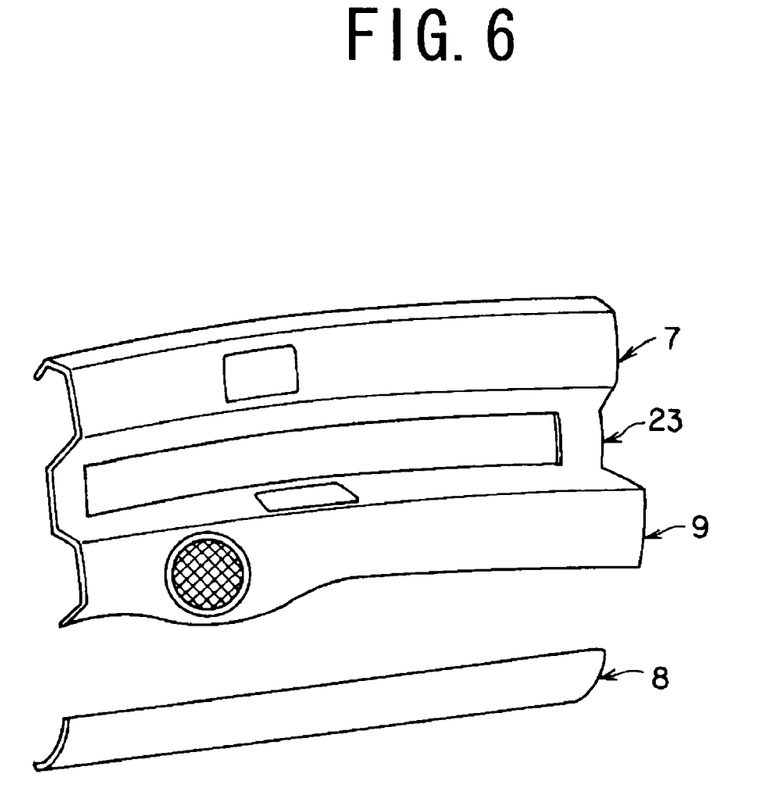
FIG. 6 is a perspective view of a trim member comprising a belt line trim and an arm rest trim coupled together.

Embodiment 1 shows the structure in which the belt line trim 7, the pocket trim 8, and the arm rest trim 9 are separated from each other. However, the head line trim 7 and the arm rest trim 9 may be connected together by connecting portions 23 at end portions in the longitudinal direction of the vehicle, as shown in FIG. 6. In such a configuration, if mounting portions between the carrier plate 4 and the inner panel 3 are provided at the end portions of the carrier plate 4 in the longitudinal direction of the vehicle, or between the belt line trim 7 and the arm rest trim 9, these mounting portions can be hidden by the connecting portions 23. Also, the effective space within the vehicle compartment can be enlarged without impairing appearance from inside the vehicle compartment. Moreover, the number of the components of the trim members can be decreased, and management of the components can be facilitated.

Figure 7:
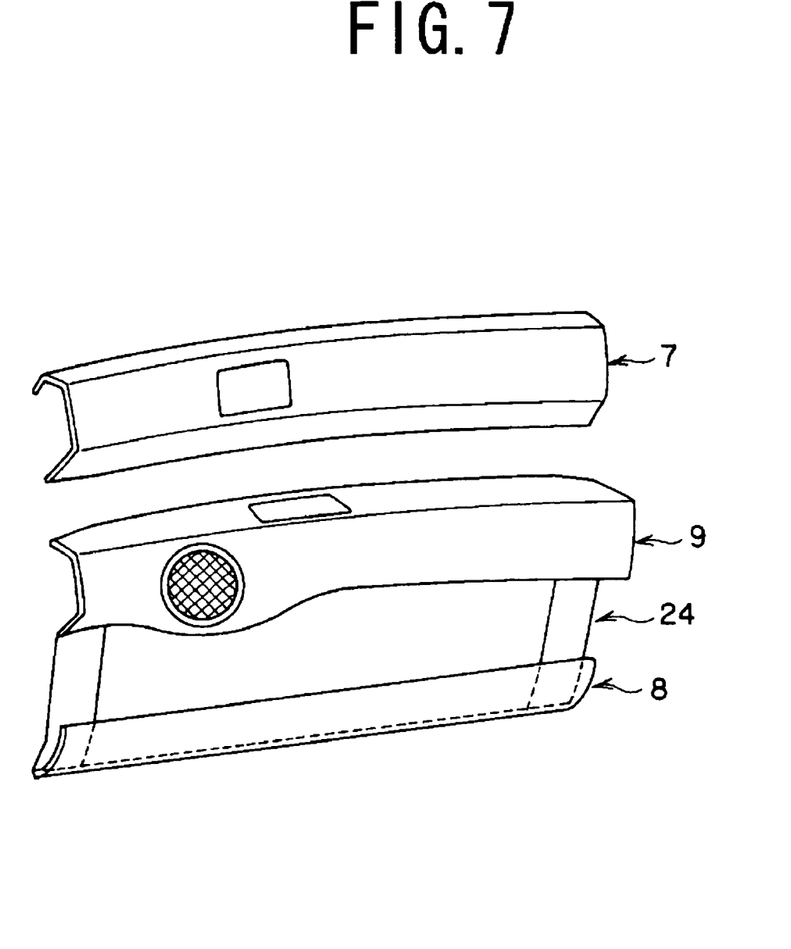
FIG. 7 is a perspective view of a trim member comprising the arm rest trim and a pocket trim coupled together.

In FIG. 6, the structure having the belt line trim 7 and the arm rest trim 9 connected together is shown. However, the same effects can be obtained even when the pocket trim 8 and the arm rest trim 9 are connected together by connecting portions 24 at end portions in the longitudinal direction of the vehicle as shown in FIG. 7. In such a configuration, if mounting portions between the carrier plate 4 and the inner panel 3 are provided at the end portions of the carrier plate 4 in the longitudinal direction of the vehicle, or between the pocket trim 8 and the arm rest trim 9, these mounting portions can be hidden by the connecting portions 24. Also, the effective space within the vehicle compartment can be enlarged without impairing appearance from inside the vehicle compartment. Moreover, the number of the components of the trim members can be decreased, and management of the components can be facilitated.

INDUSTRIAL APPLICABILITY

The present invention can be put to use in the door structure of the vehicle.

The invention claimed is:

1. A door structure of a vehicle, comprising:
an outer panel of a door;
an inner panel of the door attached to a peripheral portion of the outer panel and having an opening portion formed therein;
a carrier plate fixed to the inner panel and having assembled thereto at least one of an elevating device for raising and lowering a door glass, a door opening and closing operating device, and a door speaker, and adapted to close the opening portion formed in the inner panel; and
a plurality of trim members for partially covering an inside of the carrier plate within a vehicle compartment, the plurality of trim members being arranged at locations spaced from each other in a plane along the carrier plate, and covering mounting portions, which mount the at least one of the elevating device, the door opening and closing operating device, and the door speaker onto the carrier plate, from inside the vehicle compartment, and the carrier plate having a decorative surface exposed to an interior of the vehicle compartment, the decorative surface being exposed between the plurality of trim members.

2. The door structure of a vehicle according to claim 1, wherein
the plurality of trim members covers mounting portions for mounting of the carrier plate onto the inner panel.

3. The door structure of a vehicle according to claim 1, wherein
the plurality of trim members extends in a longitudinal direction of a vehicle body, and is arranged at locations spaced from each other in a vertical direction.

4. The door structure of a vehicle according to claim 1, wherein
the carrier plate has a step portion formed at a predetermined position spaced from an outer edge thereof to be concave outwardly of the vehicle.

5. The door structure of a vehicle according to claim 1, wherein
the plurality of trim members includes a belt line trim disposed along a belt line in an upper end portion of the inner panel, a pocket trim disposed in the vicinity of a lower portion of the inner panel, and an arm rest trim disposed between the belt line trim and the pocket trim.

6. The door structure of a vehicle according to claim 5, further comprising:
a control cable for transmitting an operating force of an inside handle, which the door opening and closing operating device has, to a latch portion, and
wherein the carrier plate has a first support portion for supporting the control cable, and a first through-hole through which the control cable is inserted, and
the belt line trim covers the first support portion and the first through-hole from inside the vehicle compartment.

7. The door structure of a vehicle according to claim 5, further comprising
a harness extending from an elevating switch of the elevating device, or from the door speaker, and
wherein the carrier plate has a second support portion for supporting the harness, and a second through-hole through which the harness is inserted, and
the arm rest trim covers the second support portion and the second through-hole from inside the vehicle compartment.

8. The door structure of a vehicle according to claim 2, wherein
the plurality of trim members extends in a longitudinal direction of a vehicle body, and is arranged at locations spaced from each other in a vertical direction.

9. The door structure of a vehicle according to claim 2, wherein
the carrier plate has a step portion formed at a predetermined position spaced from an outer edge thereof to be concave outwardly of the vehicle.

10. The door structure of a vehicle according to claim 3, wherein
the carrier plate has a step portion formed at a predetermined position spaced from an outer edge thereof to be concave outwardly of the vehicle.

11. The door structure of a vehicle according to claim 2, wherein
the plurality of trim members includes a belt line trim disposed along a belt line in an upper end portion of the inner panel, a pocket trim disposed in the vicinity of a lower portion of the inner panel, and an arm rest trim disposed between the belt line trim and the pocket trim.

12. The door structure of a vehicle according to claim 3, wherein
the plurality of trim members includes a belt line trim disposed along a belt line in an upper end portion of the inner panel, a pocket trim disposed in the vicinity of a lower portion of the inner panel, and an arm rest trim disposed between the belt line trim and the pocket trim.

13. The door structure of a vehicle according to claim 1, wherein
the carrier plate has a shape larger than the opening portion of the inner panel, but smaller than the inner panel, and
the plurality of trim members is spaced from each other vertically, and is formed to extend from the carrier plate in a longitudinal direction of a vehicle body.

14. A door structure of a vehicle, comprising:
an inner panel of a door having an opening portion formed therein;
a carrier plate fixed to the inner panel and having assembled thereto at least one of an elevating device for raising and lowering a door glass, a door opening and closing operating device, and a door speaker, and adapted to close the opening portion formed in the inner panel; and
a plurality of trim members for partially covering an inside of the carrier plate within a vehicle compartment,
the plurality of trim members being arranged at locations spaced from each other in a plane along the carrier plate, and covering mounting portions, which mount the at least one of the elevating device, the door opening and closing operating device, and the door speaker onto the carrier plate, from inside the vehicle compartment, and
the carrier plate having a decorative surface exposed to an interior of the vehicle compartment, the decorative surface being exposed between the plurality of trim members,
wherein the plurality of trim members extends in a longitudinal direction of a vehicle body, and is arranged at locations spaced from each other in a vertical direction.

* * * * *